US011454989B2

(12) United States Patent
Liu et al.

(10) Patent No.: US 11,454,989 B2
(45) Date of Patent: Sep. 27, 2022

(54) UNMANNED AERIAL VEHICLE CONTROL SYSTEM AND IMPLEMENTATION METHOD THEREFOR, GROUND CONTROL DEVICE AND RELAY STATION

(71) Applicant: AUTEL ROBOTICS CO., LTD., Guangdong (CN)

(72) Inventors: Hong Liu, Guangdong (CN); Xiaojun Hu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 275 days.

(21) Appl. No.: 16/813,031

(22) Filed: Mar. 9, 2020

(65) Prior Publication Data

US 2020/0209844 A1 Jul. 2, 2020

Related U.S. Application Data

(63) Continuation of application No. PCT/CN2018/079606, filed on Mar. 20, 2018.

(30) Foreign Application Priority Data

Sep. 8, 2017 (CN) .......................... 201710806705.6

(51) Int. Cl.
*G05D 1/00* (2006.01)
*G05D 1/10* (2006.01)
(Continued)

(52) U.S. Cl.
CPC ........... *G05D 1/101* (2013.01); *B64C 39/024* (2013.01); *G05D 1/0011* (2013.01); *H04L 12/44* (2013.01);
(Continued)

(58) Field of Classification Search
CPC .... G05D 1/101; G05D 1/0011; B64C 39/024; B64C 2201/146; H04L 12/44; H04L 67/12
See application file for complete search history.

(56) References Cited

U.S. PATENT DOCUMENTS 9,533,760 B1 * 1/2017 Wagreich .............. B64C 39/024
 348/144
11,218,934 B2 * 1/2022 Hong .................... H04W 36/08
(Continued)

FOREIGN PATENT DOCUMENTS

CN 202111870 U * 1/2012 ............ H04W 88/04
CN 202111870 U 1/2012
(Continued)

OTHER PUBLICATIONS

English machine translation for CN206004840U, Yang Yang; He Yongjun, Mar. 8, 2017 (Year: 2017).*

*Primary Examiner* — Elaine Gort
*Assistant Examiner* — Brittany Renee Peko (57) ABSTRACT

The present invention discloses an unmanned aerial vehicle control system and an implementation method therefor, a ground control device and a relay station, where the unmanned aerial vehicle control system includes an unmanned aerial vehicle and a ground control device, and further includes one or more relay stations in communication connection with the ground control device through a local area network or the Internet, the ground control device being configured to send a control instruction to control the unmanned aerial vehicle, and the relay station being configured to: when satisfying a preset condition, receive the control instruction sent by the ground control device, and send the control instruction to the unmanned aerial vehicle.

18 Claims, 3 Drawing Sheets

(51) Int. Cl.
*B64C 39/02* (2006.01)
*H04L 12/44* (2006.01)
*H04L 67/12* (2022.01)

(52) U.S. Cl.
CPC ........ *H04L 67/12* (2013.01); *B64C 2201/146* (2013.01)

(56) References Cited

U.S. PATENT DOCUMENTS

| | | |
|---|---|---|
| 2012/0298751 A1 | 11/2012 | Verna et al. |
| 2016/0054733 A1* | 2/2016 | Hollida ................ G05D 1/0038 |
| 2017/0012697 A1* | 1/2017 | Gong ................ H04B 7/18506 |

FOREIGN PATENT DOCUMENTS

| | | | | |
|---|---|---|---|---|
| CN | 205029765 U | 2/2016 | | |
| CN | 205221126 U | 5/2016 | | |
| CN | 105843183 A | 8/2016 | | |
| CN | 107734604 A | * 8/2016 | ............ | H04W 48/20 |
| CN | 206004840 U | 3/2017 | | |
| CN | 107330443 A | 11/2017 | | |
| WO | 2009/151863 A2 | 12/2009 | | |

\* cited by examiner

UNMANNED AERIAL VEHICLE CONTROL SYSTEM AND IMPLEMENTATION METHOD THEREFOR, GROUND CONTROL DEVICE AND RELAY STATION

This application is a continuation application of International Application No. PCT/CN2018/079606, filed on Mar. 20, 2018, which claims priority of Chinese Patent Application No. 201710806705.6, filed on Sep. 8, 2017, which is incorporated herein by reference in its entirely.

BACKGROUND

Technical Field

The present invention relates to the field of unmanned aerial vehicles, and in particular, to an unmanned aerial vehicle control system and an implementation method therefor, a ground control device and a relay station.

Related Art

In the prior art, real-time remote control of all unmanned aerial vehicles needs to meet requirements on line of sight. To perform trans-horizon remote control and image transmission, a relatively low frequency band needs to be used, for example, a frequency band from 300 MHz to 400 MHz or a lower frequency band. Trans-horizon transmission can be implemented to some extent through diffraction of the low frequency band. However, in this case, use of low frequency diffraction has relatively low reliability and is prone to be affected by an environment.

In addition, interactive communication between an unmanned aerial vehicle and a satellite can be used, and then communication between a ground control end and the satellite can be used, to control the unmanned aerial vehicle and receive an image sent by the unmanned aerial vehicle. However, using a satellite for relay forwarding leads to a relatively high time delay and a relatively low real-time quality, and requires to rent a satellite frequency band. Consequently, the use of this method is limited and cannot be enjoyed by an ordinary user.

SUMMARY

To resolve the foregoing technical problem, the present invention provides an unmanned aerial vehicle control system and an implementation method therefor, a ground control device and a relay station, to implement real-time trans-horizon communication of an unmanned aerial vehicle.

To achieve the objective of the present invention, an embodiment of the present invention provides an unmanned aerial vehicle control system. The unmanned aerial vehicle control system includes an unmanned aerial vehicle and a ground control device, and further includes one or more relay stations in communication connection with the ground control device through a local area network or the Internet;

the ground control device being configured to send a control instruction to control the unmanned aerial vehicle; and the relay station being configured to: when satisfying a preset condition, receive the control instruction sent by the ground control device, and send the control instruction to the unmanned aerial vehicle.

Optionally, the relay station is further configured to detect, in real time, a communication signal strength between the relay station and the unmanned aerial vehicle.

Optionally, the preset condition includes one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

Optionally, the ground control device is further configured to perform one or more of the following operations after sending the control instruction to control the unmanned aerial vehicle:

directly receiving an image signal sent by the unmanned aerial vehicle;

directly receiving a feedback signal, a current status signal and an image signal sent by the unmanned aerial vehicle;

receiving, by using the relay station satisfying the preset condition, a feedback signal, a current status signal and an image signal sent by the unmanned aerial vehicle; and obtaining an image signal received by the one or more relay stations from the unmanned aerial vehicle.

Optionally, the relay station is further configured to receive an image signal sent by the unmanned aerial vehicle and forward the image signal to the ground control device.

Optionally, the relay station is further configured to: when satisfying the preset condition, receive a feedback signal, a current status signal and an image signal sent by the unmanned aerial vehicle, and forward the feedback signal, the current status signal and the image signal to the ground control device.

Optionally, the current status signal includes one or more of a current flight speed, a current location, a current height, a current attitude and a current temperature.

Optionally, the relay station is in communication connection with the ground control device in a wired or wireless manner.

Optionally, when there is a plurality of relay stations, the ground control device and the relay stations are in a star connection.

An embodiment of the present invention further provides a ground control device. The ground control device includes a communications unit, a flight control unit, a data transmission unit and a radio frequency unit, where the communications unit is in communication connection with one or more relay stations through a local area network or the Internet;

the flight control unit is configured to send a control instruction to the data transmission unit; and the data transmission unit is configured to: send the control instruction to an unmanned aerial vehicle by using the radio frequency unit, and send, when there is a relay station satisfying a preset condition, the control instruction to the unmanned aerial vehicle through the relay station satisfying the preset condition by using the communications unit.

Optionally, the preset condition includes one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

Optionally, the data transmission unit is further configured to: receive, by using the radio frequency unit, an image signal sent by the unmanned aerial vehicle, or receive, by using the radio frequency unit, an image signal feedback signal, a current status signal and an image signal sent by the unmanned aerial vehicle.

Optionally, the data transmission unit is further configured to receive, through the relay station satisfying the preset condition by using the communications unit, a feedback signal, a current status signal and an image signal sent by the unmanned aerial vehicle.

Optionally, the data transmission unit is further configured to receive, through the one or more relay stations by using the communications unit, an image signal sent by the unmanned aerial vehicle.

Optionally, the communications unit is in communication connection with the relay station in a wired or wireless manner.

Optionally, the communications unit is in communication connection with a plurality of relay stations in a star connection manner.

An embodiment of the present invention further provides a relay station. The relay station includes a communications unit, a data transmission unit and a radio frequency unit, where the communications unit is in communication connection with a ground control device through a local area network or the Internet, and is configured to receive, when the relay station satisfies a preset condition, a control instruction sent by the ground control device; and the data transmission unit is configured to obtain the control instruction and send the control instruction to an unmanned aerial vehicle by using the radio frequency unit.

Optionally, the radio frequency unit is configured to detect, in real time, a communication signal strength between the relay station and the unmanned aerial vehicle.

Optionally, the preset condition includes one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

Optionally, the data transmission unit is further configured to receive, by using the radio frequency unit, an image signal sent by the unmanned aerial vehicle and forward the image signal to the ground control device by using the communications unit.

Optionally, the data transmission unit is further configured to: when the relay station satisfies the preset condition, receive, by using the radio frequency unit, a feedback signal, a current status signal and an image signal sent by the unmanned aerial vehicle, and forward the feedback signal, the current status signal and the image signal to the ground control device by using the communications unit.

Optionally, the communications unit is in communication connection with the ground control device in a wired or wireless manner.

An embodiment of the present invention further provides an implementation method for an unmanned aerial vehicle control system, where the unmanned aerial vehicle control system includes an unmanned aerial vehicle, a ground control device and one or more relay stations in communication connection with the ground control device through a local area network or the Internet, and the implementation method includes:

sending, by the ground control device, a control instruction to control the unmanned aerial vehicle; and receiving, by a relay station satisfying a preset condition, the control instruction sent by the ground control device, and sending the control instruction to the unmanned aerial vehicle.

Optionally, the preset condition includes one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

Optionally, the implementation method further includes:
performing, by the ground control device, one or more of the following operations after sending the control instruction to control the unmanned aerial vehicle:

directly receiving an image signal sent by the unmanned aerial vehicle;

directly receiving a feedback signal, a current status signal and an image signal sent by the unmanned aerial vehicle;

receiving, by using the relay station satisfying the preset condition, a feedback signal, a current status signal and an image signal sent by the unmanned aerial vehicle; and obtaining an image signal received by the one or more relay stations from the unmanned aerial vehicle.

Optionally, the implementation method further includes:
receiving, by the relay station, an image signal sent by the unmanned aerial vehicle, and forwarding the image signal to the ground control device.

Optionally, the implementation method further includes:

receiving, by the relay station satisfying the preset condition, a feedback signal, a current status signal and an image signal sent by the unmanned aerial vehicle, and forwarding the feedback signal, the current status signal and the image signal to the ground control device.

Optionally, the ground control device is in communication connection with the relay station in a wired or wireless manner.

Optionally, when there is a plurality of relay stations, the ground control device and the relay stations are in a star connection.

According to the embodiments of the present invention, the unmanned aerial vehicle control system includes the unmanned aerial vehicle and the ground control device, and further includes one or more relay stations in communication connection with the ground control device through a local area network or the Internet, the ground control device being configured to send a control instruction to control the unmanned aerial vehicle, and the relay station being configured to: when satisfying a preset condition, receive the control instruction sent by the ground control device, and send the control instruction to the unmanned aerial vehicle. In the embodiments of the present invention, the number of relay stations is increased, so that a distance for remote control and image transmission between the unmanned aerial vehicle and a ground control end is significantly increased. Networking of the unmanned aerial vehicle control system is flexible and configuration is optional. An ad hoc network (for example, a local area network) may be used or a public network (for example, the Internet) may be accessed. The ad hoc network mode, due to a controllable time delay and a high real-time quality, can ensure a real-time quality and stability of remote control and image transmission, and is easy in use and low in costs.

Other features and advantages of the present invention are subsequently described in the specification, and some are apparent in the specification, or are known by implementing the present invention. The objectives and other advantages of the present invention can be implemented and obtained by using structures specified in the specification, the claims, and the accompanying drawings.

BRIEF DESCRIPTION OF THE DRAWINGS

The accompanying drawings are used for providing further understanding of technical solutions of the present invention and constitute a part of the specification to describe the technical solutions of the present invention together with embodiments of the present application, but are not intended to limit the technical solutions of the present invention. A person of ordinary skill in the art may still derive accompanying drawings of other embodiments from these accompanying drawings without creative efforts.

DETAILED DESCRIPTION

To make the objectives, technical solutions, and advantages of the present invention clearer, the following describes embodiments of the present invention in detail with reference to the accompanying drawings. It should be noted that the embodiments of the present application and characteristics of the embodiments may be randomly combined with each other provided that there is no conflict.

Steps shown in flowcharts of the accompanying drawings may be performed, for example, in a computer system of a set of computer executable instructions. In addition, although a logical sequence is shown in a flowchart, the shown or described steps may be performed in a different sequence in some cases.

A flight height of an unmanned aerial vehicle is limited and line of sight is relatively greatly blocked by terrains or buildings. Therefore, to implement a trans-horizon flight, real-time trans-horizon remote control and image transmission of the unmanned aerial vehicle need to be implemented.

Figure 1:
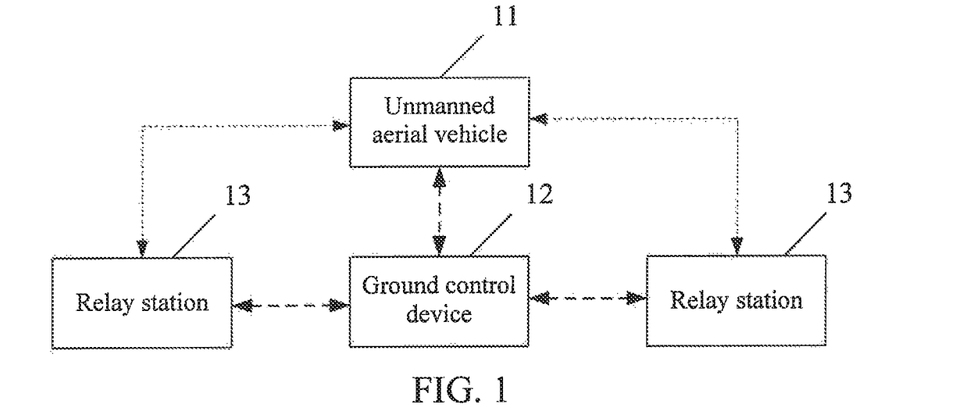
FIG. 1 is a schematic diagram of an unmanned aerial vehicle control system according to an embodiment of the present invention.

As shown in FIG. 1, an embodiment of the present invention provides an unmanned aerial vehicle control system. The unmanned aerial vehicle control system includes an unmanned aerial vehicle 11, a ground control device 12, and one or more relay stations 13 (a case in which two relay stations are included is shown, and the number of relay stations can be one or more) in communication connection with the ground control device through a local area network or the Internet.

The ground control device 12 is configured to send a control instruction to control the unmanned aerial vehicle 11.

The relay station 13 is configured to: when satisfying a preset condition, receive the control instruction sent by the ground control device 12, and send the control instruction to the unmanned aerial vehicle 11.

In this embodiment of the present invention, the number of relay stations 13 is increased, so that a distance for remote control and image transmission between the unmanned aerial vehicle 11 and a ground control end is significantly increased. Networking of the unmanned aerial vehicle control system is flexible, and an ad hoc network (for example, a local area network) may be used or a public network (for example, the Internet) may be accessed. The ad hoc network mode, due to a controllable time delay and a high real-time quality, can ensure a real-time quality and stability of remote control and image transmission, and is easy in use and low in costs.

The ground control device 12 is a control end of the unmanned aerial vehicle control system that controls the unmanned aerial vehicle 11 in real time. The ground control device 12 delivers a control instruction to the unmanned aerial vehicle 11 to control a device on the unmanned aerial vehicle 11 to complete a flight task, and receives a plurality of signals, including but not limited to a feedback signal, a current status signal and an image signal, backhauled from the unmanned aerial vehicle 11. In some other embodiments, the control end may further be a remote control, a control handle, or another electronic device having a remote control function.

According to this embodiment of the present invention, the number and locations of the relay stations 13 can be flexibly deployed based on specific situations in a plurality of aspects such as a degree of terrain blocking and a level of signal interference.

A wired local area network or a wireless local area network may be used to implement communication between the relay station 13 and the ground control device 12. For example, the wired local area network may be implemented by using a fiber or a cable, and the wireless local area network may be implemented by using Wireless-Fidelity (Wi-Fi) or Bluetooth.

When a requirement for a time delay is not high, the Internet may be used to connect the relay stations 13 and the ground control device 12 for communication, and a wired manner such as a cable or a fiber may be used for the connection. However, the connection manner is not limited thereto. For example, a wireless manner may be used, for example, a mobile communications network is accessed by a 2G, 3G, 4G, or 5G module in a wireless manner, thereby implementing a connection to the Internet.

When there is a plurality of relay stations, a star connection manner can be adopted for communication connection among the ground control device and the relay stations. To be specific, the ground control device is used as a central node, and each of the relay stations establishes a connection to the ground control device. This connection manner is also referred to as a star topology.

In an implementation, the relay station 13 is further configured to detect, in real time, a communication signal strength between the relay station 13 and the unmanned aerial vehicle.

In an implementation, the ground control device 12 is further configured to detect, in real time, a communication signal strength between the ground control device 12 and the unmanned aerial vehicle 11.

In an implementation, the preset condition includes one of the following conditions:

the communication signal strength between the relay station 13 and the unmanned aerial vehicle 11 is higher than communication signal strengths between other relay stations 13 and the unmanned aerial vehicle 11 and higher than the communication signal strength between the ground control device 12 and the unmanned aerial vehicle 11 by a first threshold; the communication signal strength between the ground control device 12 and the unmanned aerial vehicle 11 is less than a second threshold, and among all relay stations 13, the communication signal strength between the relay station 13 and the unmanned aerial vehicle 11 is the highest; and a switch instruction is received, the switch instruction instructing to forward a control instruction by using a specified relay station.

The ground control device 12 may directly communicate with the unmanned aerial vehicle 11, or when there is a relay station 13 satisfying the preset condition, communicate with the unmanned aerial vehicle 11 through the relay station 13.

The preset condition may be set according to an actual situation. That the ground control device 12 communicates with the unmanned aerial vehicle through the relay station usually happens when a communication signal between the ground control device 12 and the unmanned aerial vehicle 11 is weak while a communication signal between the relay station and the unmanned aerial vehicle is strong, or happens when a switch instruction is received. This embodiment of the present invention is not limited thereto, and another preset condition may be further set according to an actual situation.

The ground control device 12 is further configured to perform one or more of the following operations after sending the control instruction to control the unmanned aerial vehicle 11:

directly receiving an image signal sent by the unmanned aerial vehicle 11;

directly receiving a feedback signal, a current status signal and an image signal sent by the unmanned aerial vehicle 11;

receiving, by using the relay station 13 satisfying the preset condition, a feedback signal, a current status signal and an image signal sent by the unmanned aerial vehicle 11; and obtaining an image signal received by the one or more relay stations 13 from the unmanned aerial vehicle 11.

The directly receiving a signal from the unmanned aerial vehicle 11 means that the ground control device 12 receives the signal from the unmanned aerial vehicle 11 without using the relay station 13 for forwarding.

It should be noted that the image signal may alternatively be referred to as image data, and the current status signal may alternatively be referred to as current status data. For consistency of expression, data/signal sent by the unmanned aerial vehicle is collectively referred to as a signal.

The current status signal may be one or more of a plurality of current statuses, for example, a current flight speed, a current location, a current height, a current attitude and a current temperature, of the unmanned aerial vehicle that is detected by a built-in sensor and a built-in detection device of the unmanned aerial vehicle.

The ground control device 12 may receive a feedback signal, a current status signal and an image signal of the unmanned aerial vehicle 11 by using the relay station 13 satisfying the preset condition, to learn of a status of the unmanned aerial vehicle 11, or may select to directly receive a feedback signal, a current status signal and an image signal or a part of the signals of the unmanned aerial vehicle 11.

The ground control device 12 may select to obtain an image signal received by the one or more relay stations 13 and sent by the unmanned aerial vehicle and display the image signal.

In an implementation, the relay station 13 is further configured to receive an image signal sent by the unmanned aerial vehicle 11 and forward the image signal to the ground control device 12.

When not responsible for forwarding a control instruction, the relay station 13 is not configured to control the unmanned aerial vehicle 11, but may still receive an image signal sent by the unmanned aerial vehicle 11 and send the image signal to the ground control device 12.

In an implementation, the relay station 13 is further configured to: when satisfying a preset condition, receive a feedback signal, a current status signal and an image signal sent by the unmanned aerial vehicle 11, and forward the feedback signal, the current status signal and the image signal to the ground control device 12.

Figure 2:
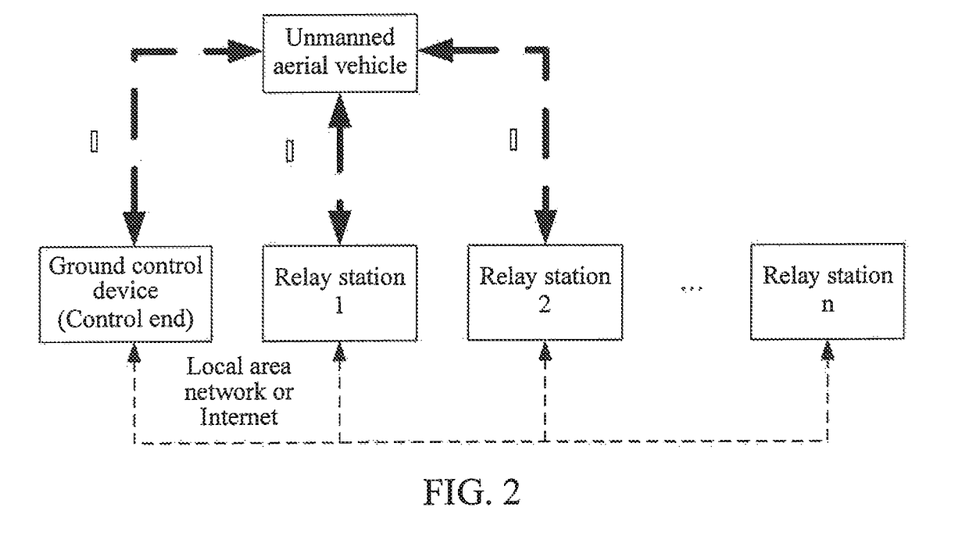
FIG. 2 is a schematic diagram of communication during flight of an unmanned aerial vehicle according to an embodiment of the present invention.

The following describes the implementation process:

As shown in FIG. 2, the unmanned aerial vehicle is directly controlled by the ground control device at a take-off point, and signals between the unmanned aerial vehicle and the ground control device are directly exchanged by using a space link (1). An uplink signal is a signal sent by the ground control device, which may include a control instruction (a control signal), and a downlink signal is a signal sent by the unmanned aerial vehicle, which may include a feedback signal, a current status signal and an image signal. The current status signal may include one or more of a current flight speed, a current location, a current height, a current attitude and a current temperature.

When the unmanned aerial vehicle flies to a location on the link (1) at which a signal is relatively weak (for example, the unmanned aerial vehicle is blocked and beyond a line of sight), if a relay station 1 satisfies a preset condition, a space link (2) is switched to for communication between the relay station 1 and the unmanned aerial vehicle, and an uplink signal and/or a downlink signal is transmitted. The preset condition may be set according to an actual situation. For example, a signal strength between the relay station 1 and the unmanned aerial vehicle is higher than communication signal strengths between other relay stations and the unmanned aerial vehicle and higher than a communication signal strength between the ground control device and the unmanned aerial vehicle by a first threshold, or the communication signal strength between the ground control device and the unmanned aerial vehicle is less than a second threshold, and among all relay stations, a communication signal strength between the relay station 1 and the unmanned aerial vehicle is the highest, or the relay station 1 and the ground control device receive a switch instruction. In this case, the relay station 1 communicates with the ground control device through an ad hoc network or a public network system, to implement real-time remote control and image transmission of the unmanned aerial vehicle by the ground control device.

When the unmanned aerial vehicle flies beyond a communication range of the relay station 1 (at which a signal is weak) and into a communication range of a relay station 2, if the relay station 2 satisfies the preset condition, communication between the relay station 2 and the unmanned aerial vehicle by using a radio link (3) may be switched to for implementing remote control and image signal transmission of the unmanned aerial vehicle by the ground control device. By analogy, the number and specific locations of the relay stations may be selected according to an actual situation such as a flight distance of the unmanned aerial vehicle and ground blocking.

When the ground control device interactively communicates with the unmanned aerial vehicle by using the radio link (1), remaining relay stations may only receive an image signal and detect a signal strength of a remote control signal in real time. When one of the relay stations is determined to satisfy the preset condition, for example, when a remote control signal strength detected by this relation station is higher than signal strengths detected by remaining relay stations (including the ground control device) by a threshold (which is set based on an actual test requirement, for example, may be set to 6 dB), remote control signal communication between the ground control device and the unmanned aerial vehicle is forwarded by the relay station, to ensure best remote control signal quality of the unmanned aerial vehicle. For example, when the ground control device communicates with the unmanned aerial vehicle by using the radio link (1), if the ground control device detects that a signal strength received from the unmanned aerial vehicle is −90 dBm, and the relay station 1 detects that a remote control signal strength received from the unmanned aerial vehicle by using the radio link (2) is −84 dBm, the ground control device delivers a synchronization instruction to instruct the relay station 1 and the unmanned aerial vehicle to be synchronized, and the ground control device receives a signal from the unmanned aerial vehicle by using only the radio link (1). A control instruction is used for communication with the unmanned aerial vehicle through an ad hoc network or a public network between the ground control device and the relay station 1 and then through the relay station 1 by using the radio link (2).

Figure 3:
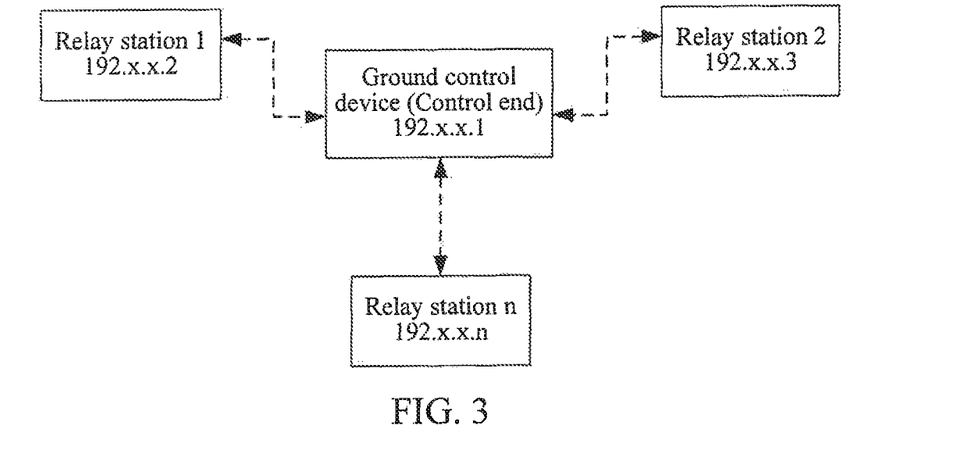
FIG. 3 is a schematic diagram of networking between a ground control device and a relay station according to an embodiment of the present invention.

Communication between the ground control device and each relay station may be implemented through IP (Internet Protocol, a protocol of interconnection between networks) access, and the ground control device used as a server and the relay stations are in a star connection, that is, a networking form shown in FIG. 3.

Figure 4:
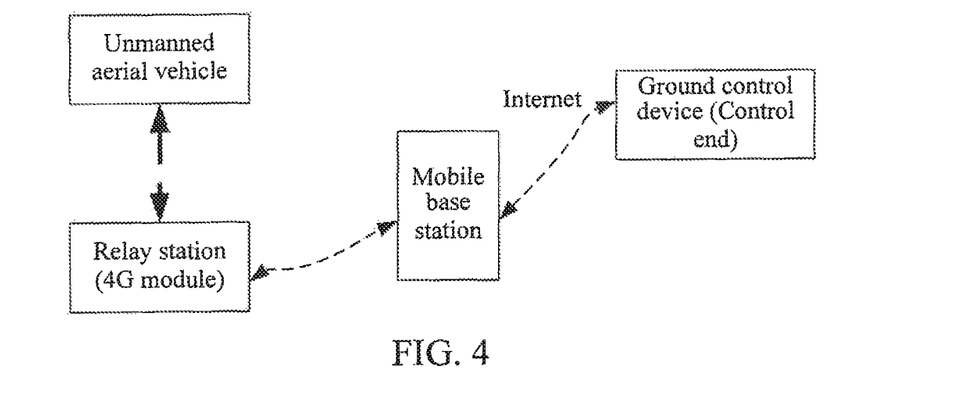
FIG. 4 is a schematic diagram of connecting a relay station in a wireless manner according to an embodiment of the present invention.

The relay station may not need to be attended by personnel and may provide only a power supply (a battery, mains, or the like). A fiber or a CAT-5 cable may be used for networking if allowed, and a wireless communications module (for example, a 2G, 3G, 4G or 5G module) is used as a node for accessing a mobile communications network if there is no wired network. As shown in FIG. 4, the relay station uses a 4G module to access the Internet through a mobile base station, to connect to the ground control device.

Image signals independently received by each of the ground control device and the relay stations may be displayed in real time by using the ground control device. An image signal received by the ground control device or a particular relay station may be displayed, or the image signals of the ground control device and the relay stations may be simultaneously displayed. This is selected by the user at a ground control device end.

Figure 5:
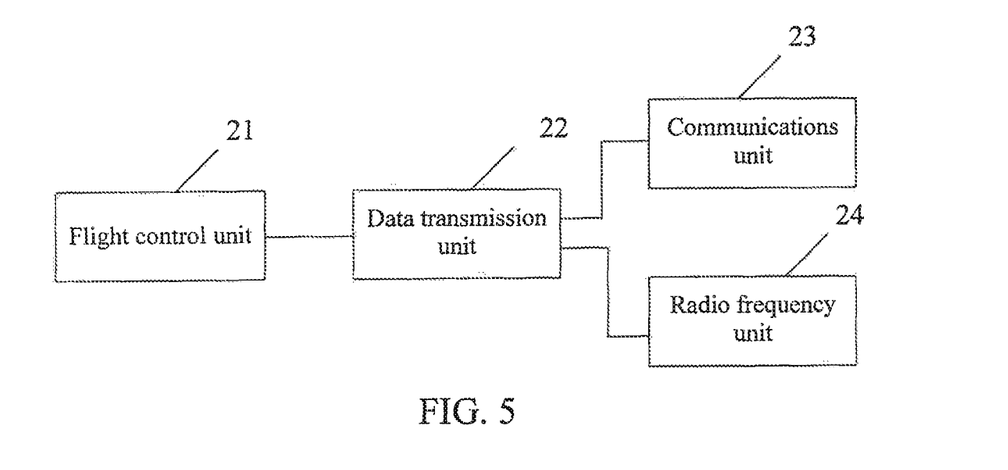
FIG. 5 is a schematic composition diagram of a ground control device according to an embodiment of the present invention.

Referring to the foregoing description, as shown in FIG. 5, an embodiment of the present invention further provides a ground control device. The ground control device includes a flight control unit 21, a data transmission unit 22, a communications unit 23 and a radio frequency unit 24, where the communications unit 23 is in communication connection with one or more relay stations through a local area network or the Internet;

the flight control unit 21 is configured to send a control instruction to the data transmission unit 22; and the data transmission unit 22 is configured to: send the control instruction to an unmanned aerial vehicle by using the radio frequency unit 24, and send, when there is a relay station satisfying a preset condition, the control instruction to the unmanned aerial vehicle through the relay station satisfying the preset condition by using the communications unit 23.

The communications unit 23, when in communication connection with the relay station through a wired local area network, may include a network interface, and when in communication connection with the relay station through a wireless local area network, may include a wireless communications module, for example, a Wi-Fi module, a Bluetooth module or a mobile communications module (for example, a 2G, 3G, 4G or 5G module), and may further include interfaces such as a Universal Serial Bus (USB) interface and a Peripheral Component Interconnect (PCI) interface.

The ground control device may further include an auxiliary control unit (for example, responsible for controlling a gimbal on the unmanned aerial vehicle), a power supply unit, a display unit, or the like.

In an implementation, the preset condition includes one of the following conditions:

a communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

In an implementation, the data transmission unit 22 is further configured to: receive, by using the radio frequency unit 24, an image signal sent by the unmanned aerial vehicle, or receive, by using the radio frequency unit 24, an image signal feedback signal, a current status signal and an image signal sent by the unmanned aerial vehicle.

In an implementation, the data transmission unit 22 is further configured to receive, through the relay station satisfying the preset condition by using the communications unit 23, a feedback signal, a current status signal and an image signal sent by the unmanned aerial vehicle.

In an implementation, the data transmission unit 22 is further configured to receive, through the one or more relay stations by using the communications unit 23, an image signal sent by the unmanned aerial vehicle.

In an implementation, the communications unit 23 is in communication connection with the relay station in a wired or wireless manner.

In an implementation, the communications unit 23 is in communication connection with a plurality of relay stations in a star connection manner.

In this embodiment of the present invention, the relay station is configured to forward a control instruction, so that a distance for remote control and image transmission between the unmanned aerial vehicle and a ground control end is significantly increased. Networking between the ground control device and the relay station is flexible and configuration is optional. An ad hoc network (for example, a local area network) may be used or a public network (for example, the Internet) may be accessed. The ad hoc network mode, due to a controllable time delay and a high real-time quality, can ensure a real-time quality and stability of remote control and image transmission, and is easy in use and low in costs.

Figure 6:
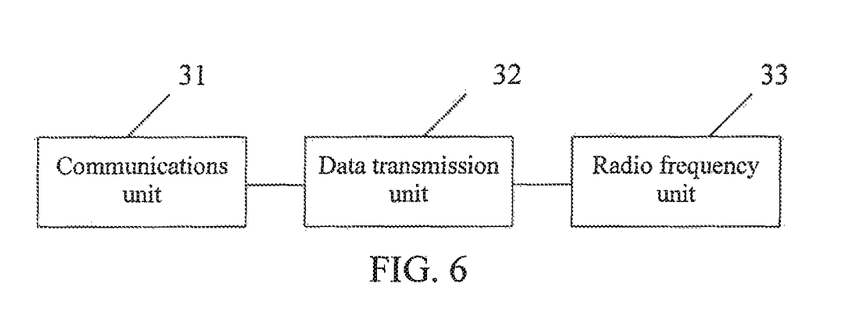
FIG. 6 is a schematic composition diagram of a relay station according to an embodiment of the present invention.

Referring to the foregoing description, as shown in FIG. 6, embodiments of the present invention further provide a relay station. The relay station includes a communications unit 31, a data transmission unit 32 and a radio frequency unit 33, where the communications unit 31 is in communication connection with a ground control device through a local area network or the Internet, and is configured to receive, when the relay station satisfies a preset condition, a control instruction sent by the ground control device; and the data transmission unit 32 is configured to obtain the control instruction and send the control instruction to an unmanned aerial vehicle by using the radio frequency unit 33.

The communications unit 31, when in communication connection with the ground control device through a wired local area network, may include a network interface, and when in communication connection with the ground control device through a wireless local area network, may include a wireless communications module, for example, a Wi-Fi module, a Bluetooth module or a mobile communications module (for example, a 2G, 3G, 4G or 5G module), and may further include interfaces such as a USB interface and a PCI interface.

The relay station may further include a power supply unit or the like.

In an implementation, the radio frequency unit 33 is further configured to detect, in real time, a communication signal strength between the relay station and the unmanned aerial vehicle.

In an implementation, the preset condition includes one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

In an implementation, the data transmission unit 32 is further configured to receive, by using the radio frequency unit 33, an image signal sent by the unmanned aerial vehicle and forward the image signal to the ground control device by using the communications unit 31.

In an implementation, the data transmission unit 32 is further configured to: when the relay station satisfies the preset condition, receive, by using the radio frequency unit 33, a feedback signal, a current status signal and an image signal sent by the unmanned aerial vehicle, and forward the feedback signal, the current status signal and the image signal to the ground control device by using the communications unit 31.

In an implementation, the communications unit 31 is in communication connection with the ground control device in a wired or wireless manner.

In this embodiment of the present invention, the relay station is configured to forward a control instruction, so that a distance for remote control and image transmission between the unmanned aerial vehicle and a ground control end is significantly increased. Networking between the ground control device and the relay station is flexible and configuration is optional. An ad hoc network (for example, a local area network) may be used or a public network (for example, the Internet) may be accessed. The ad hoc network mode, due to a controllable time delay and a high real-time quality, can ensure a real-time quality and stability of remote control and image transmission, and is easy in use and low in costs.

Figure 7:
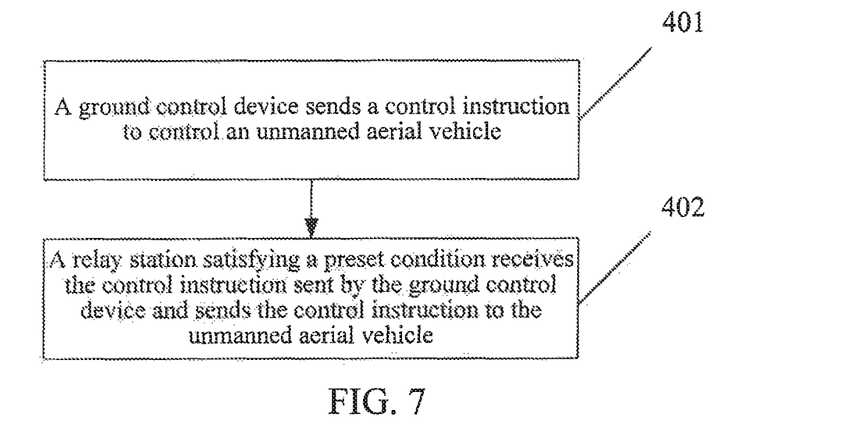
FIG. 7 is a flowchart of an implementation method for an unmanned aerial vehicle control system according to an embodiment of the present invention.

As shown in FIG. 7, an embodiment of the present invention further provides an implementation method for an unmanned aerial vehicle control system, where the unmanned aerial vehicle control system includes an unmanned aerial vehicle, a ground control device and one or more relay stations in communication connection with the ground control device through a local area network or the Internet, and the implementation method includes:

Step 401: The ground control device sends a control instruction to control the unmanned aerial vehicle.

Step 402: A relay station satisfying a preset condition receives the control instruction sent by the ground control device and sends the control instruction to the unmanned aerial vehicle.

In an implementation, the preset condition includes one of the following conditions:

a communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold;

the communication signal strength between the ground control device and the unmanned aerial vehicle is less than a second threshold, and among all relay stations, the communication signal strength between the relay station and the unmanned aerial vehicle is the highest; and a switch instruction is received, the switch instruction instructing to forward a control instruction by using a specified relay station.

In an implementation, the ground control device performs one or more of the following operations after sending the control instruction to control the unmanned aerial vehicle:

directly receiving an image signal sent by the unmanned aerial vehicle;

directly receiving a feedback signal, a current status signal and an image signal sent by the unmanned aerial vehicle;

receiving, by using the relay station satisfying the preset condition, a feedback signal, a current status signal and an image signal sent by the unmanned aerial vehicle; and obtaining an image signal received by the one or more relay stations from the unmanned aerial vehicle.

In an implementation, the implementation method further includes:

receiving, by the relay station, an image signal sent by the unmanned aerial vehicle, and forwarding the image signal to the ground control device.

In an implementation, the implementation method further includes:

receiving, by the relay station satisfying the preset condition, a feedback signal, a current status signal and an image signal sent by the unmanned aerial vehicle, and forwarding the feedback signal, the current status signal and the image signal to the ground control device.

In an implementation, the ground control device is in communication connection with the relay station in a wired or wireless manner.

In an implementation, when there is a plurality of relay stations, the ground control device and the relay stations are in a star connection.

In this embodiment of the present invention, the number of relay stations is increased, so that a distance for remote control and image transmission between the unmanned aerial vehicle and a ground control end is significantly increased. Networking of the unmanned aerial vehicle control system is flexible and configuration is optional. An ad hoc network (for example, a local area network) may be used or a public network (for example, the Internet) may be accessed. The ad hoc network mode, due to a controllable time delay and a high real-time quality, can ensure a real-time quality and stability of remote control and image transmission, and is easy in use and low in costs.

An embodiment of the present invention further provides a computer readable storage medium storing a computer executable instruction. The computer executable instruction, when executed by a processor, implements an implementation method for the foregoing unmanned aerial vehicle control system.

In this embodiment, the computer readable storage medium described above may include but is not limited to: any medium that can store program code, such as a USB flash drive, a read-only memory (ROM), a random access memory (RAM), a removable hard disk, a magnetic disk or an optical disc.

For an example in this embodiment, refer to the examples described in the foregoing embodiments and implementations. Details are not described in this embodiment again.

Apparently, a person skilled in the art should understand that the modules or steps in the foregoing embodiments of the present invention may be implemented by using a general computing apparatus. They may be integrated in a single computing apparatus or distributed on a network formed by a plurality of computing apparatuses. Optionally, they may be implemented with program code executable for a computing apparatus and may therefore be stored in a storage apparatus and performed by a computing apparatus. In some cases, the shown or described steps may be performed in a sequence different from the sequence shown herein, or they may be made into integrated circuit modules for implementation, or a plurality of modules or steps are made into a single integrated circuit for implementation. In this way, the embodiments of the present invention are not limited to any specific combination of hardware and software.

Although the implementations of the present invention are described above, they are merely implementations for facilitating understanding the present invention, and are not intended to limit the present invention. A person skilled in the art of the present invention can make any modification or variation on forms and details of the implementations without departing from the spirit and scope disclosed by the present invention. However, the patent protection scope of the present invention is still subject to the scope defined by the appended claims.

What is claimed is:

1. An unmanned aerial vehicle control system, comprising an unmanned aerial vehicle and a ground control device, wherein the unmanned aerial vehicle control system further comprises one or more relay stations in communication connection with the ground control device through a local area network or the Internet, the ground control device being configured to:

send a control instruction to control the unmanned aerial vehicle;

and obtain an image signal received by the one or more relay stations from the unmanned aerial vehicle; and the relay station being configured to:

when satisfying a preset condition, receive the control instruction sent by the ground control device, and send the control instruction to the unmanned aerial vehicle;

and receive an image signal sent by the unmanned aerial vehicle and forward the image signal to the ground control device;

wherein the preset condition comprises: a switch instruction is received, the switch instruction instructing to forward a control instruction by using a specified relay station.

2. The unmanned aerial vehicle control system according to claim 1, wherein the relay station is further configured to detect, in real time, a communication signal strength between the relay station and the unmanned aerial vehicle.

3. The unmanned aerial vehicle control system according to claim 1, wherein
the preset condition further comprises one of the following conditions:
the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold; and
the communication signal strength between the ground control device and the unmanned aerial vehicle is less than a second threshold, and among all relay stations, the communication signal strength between the relay station and the unmanned aerial vehicle is the highest.

4. The unmanned aerial vehicle control system according to claim 1, wherein
the ground control device is further configured to perform one or more of the following operations after sending the control instruction to control the unmanned aerial vehicle:
directly receiving an image signal sent by the unmanned aerial vehicle;
directly receiving a feedback signal, a current status signal and an image signal sent by the unmanned aerial vehicle; and
receiving, by using the relay station satisfying the preset condition, a feedback signal, a current status signal and an image signal sent by the unmanned aerial vehicle.

5. The unmanned aerial vehicle control system according to claim 1, wherein
the relay station is further configured to: when satisfying the preset condition, receive a feedback signal, a current status signal and an image signal sent by the unmanned aerial vehicle, and forward the feedback signal, the current status signal and the image signal to the ground control device.

6. The unmanned aerial vehicle control system according to claim 4, wherein
the current status signal comprises one or more of a current flight speed, a current location, a current height, a current attitude and a current temperature.

7. The unmanned aerial vehicle control system according to claim 1, wherein
the relay station is in communication connection with the ground control device in a wired or wireless manner.

8. The unmanned aerial vehicle control system according to claim 1, wherein
when there is a plurality of relay stations, the ground control device and the relay stations are in a star connection.

9. A ground control device, comprising a communications unit, a flight control unit, a data transmission unit and a radio frequency unit, wherein
the communications unit is in communication connection with one or more relay stations through a local area network or the Internet;
the flight control unit is configured to send a control instruction to the data transmission unit; and
the data transmission unit is configured to: send the control instruction to an unmanned aerial vehicle by using the radio frequency unit; send, when there is a relay station satisfying a preset condition, the control instruction to the unmanned aerial vehicle through the relay station satisfying the preset condition by using the communications unit; and receive, by using the radio frequency unit, an image signal sent by the unmanned aerial vehicle;
wherein the preset condition comprises: a switch instruction is received, the switch instruction instructing to forward a control instruction by using a specified relay station.

10. The ground control device according to claim 9, wherein
the preset condition further comprises one of the following conditions:
a communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold; and the communication signal strength between the ground control device and the unmanned aerial vehicle is less than a second threshold, and among all relay stations, the communication signal strength between the relay station and the unmanned aerial vehicle is the highest.

11. The ground control device according to claim 9, wherein receive, by using the radio frequency unit, an image signal feedback signal, a current status signal and an image signal sent by the unmanned aerial vehicle.

12. The ground control device according to claim 9, wherein
the data transmission unit is further configured to receive, through the relay station satisfying the preset condition by using the communications unit, a feedback signal, a current status signal and an image signal sent by the unmanned aerial vehicle.

13. The ground control device according to claim 9, wherein
the data transmission unit is further configured to receive, through the one or more relay stations by using the communications unit, an image signal sent by the unmanned aerial vehicle.

14. The ground control device according to claim 9, wherein
the communications unit is in communication connection with the relay station in a wired or wireless manner.

15. The ground control device according to claim 9, wherein
the communications unit is in communication connection with a plurality of relay stations in a star connection manner.

16. A relay station, comprising a communications unit, a data transmission unit and a radio frequency unit, wherein
the communications unit is in communication connection with a ground control device through a local area network or the Internet, and is configured to receive, when the relay station satisfies a preset condition, a control instruction sent by the ground control device; and
the data transmission unit is configured to: obtain the control instruction and send the control instruction to an unmanned aerial vehicle by using the radio frequency unit; and receive, by using the radio frequency unit, an image signal sent by the unmanned aerial vehicle and forward the image signal to the ground control device by using the communications unit;

wherein the preset condition comprises: a switch instruction is received, the switch instruction instructing to forward a control instruction by using a specified relay station.

17. The relay station according to claim 16, wherein the radio frequency unit is configured to detect, in real time, a communication signal strength between the relay station and the unmanned aerial vehicle.

18. The relay station according to claim 16, wherein the preset condition further comprises one of the following conditions:

the communication signal strength between the relay station and the unmanned aerial vehicle is higher than communication signal strengths between other relay stations and the unmanned aerial vehicle and higher than a communication signal strength between the ground control device and the unmanned aerial vehicle by a first threshold; and the communication signal strength between the ground control device and the unmanned aerial vehicle is less than a second threshold, and among all relay stations, the communication signal strength between the relay station and the unmanned aerial vehicle is the highest.

\* \* \* \* \*